No. 766,793. PATENTED AUG. 2, 1904.
F. H. RICHARDS.
UNION FOR ROCK SHAFTS AND ROCKER ARMS.
APPLICATION FILED OCT. 2, 1903.
NO MODEL.
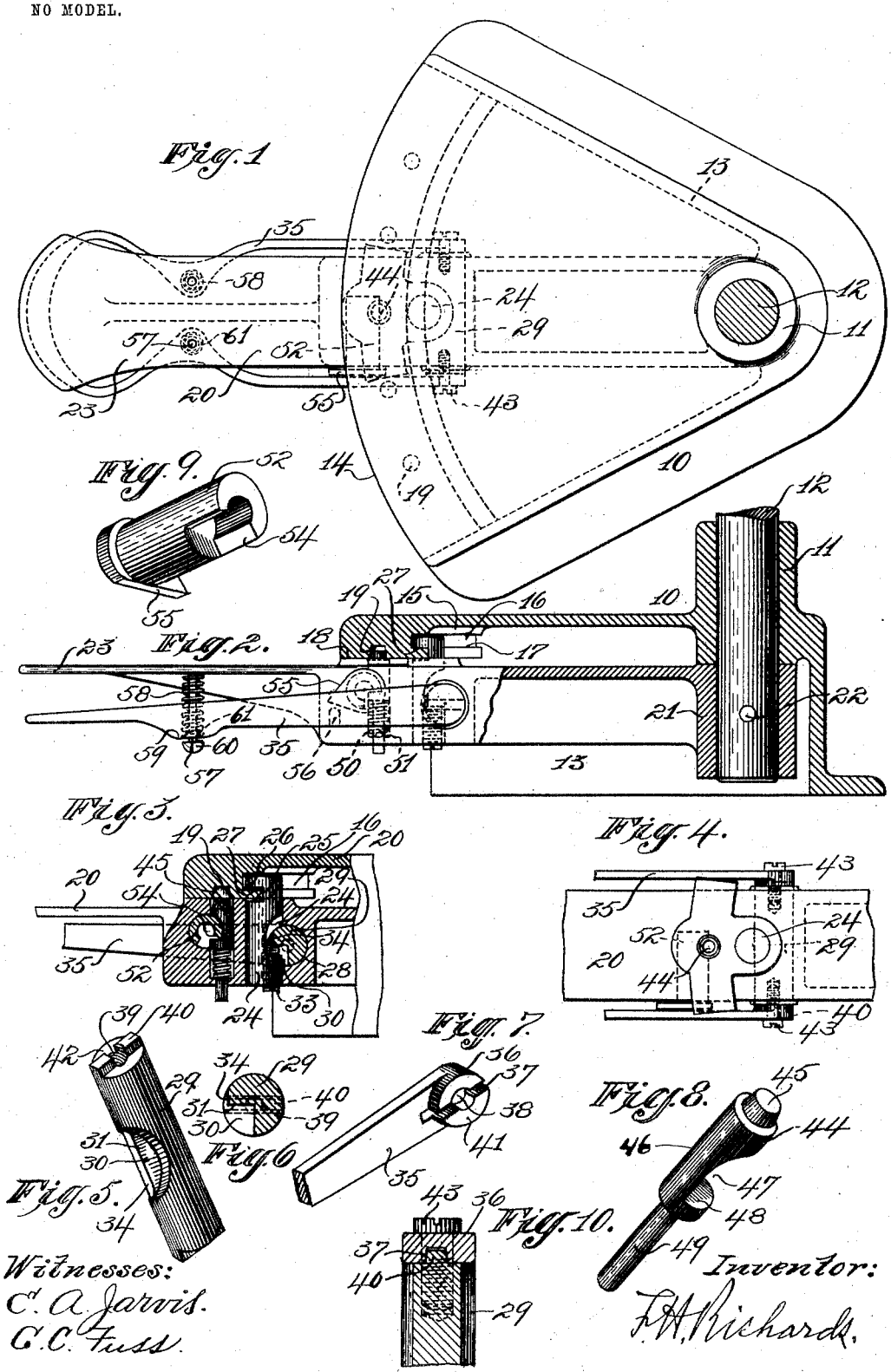
Witnesses:
C. A. Jarvis.
G. C. Fuss.
Inventor:
F. H. Richards.

No. 766,793. Patented August 2, 1904.

UNITED STATES PATENT OFFICE.

FRANCIS H. RICHARDS, OF HARTFORD, CONNECTICUT, ASSIGNOR TO THE STANLEY RULE & LEVEL COMPANY, OF NEW BRITAIN, CONNECTICUT, A CORPORATION OF CONNECTICUT.

UNION FOR ROCK-SHAFTS AND ROCKER-ARMS.

SPECIFICATION forming part of Letters Patent No. 766,793, dated August 2, 1904.

Application filed October 2, 1903. Serial No. 175,424. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Unions for Rock-Shafts and Rocker-Arms, of which the following is a specification.

This invention relates to machine elements, and has for its object to provide means to securely unite parts together and to afford means for their ready assemblage with the mechanism in which they may be included, as well as with each other.

In many mechanical employments it is frequently required to operate certain parts by means of rock-shafts and to control such rock-shafts by means of arms fast thereon and which from the general environment of the rock-shafts cannot conveniently be made integral therewith and wherein there will not of necessity be any adjustment between the controlling arm or lever and the rock-shaft after the parts have been assembled.

In carrying out my invention the rock-shaft will in a preferred form have ribs or keys protruding from its ends and the lever will be bow-shaped or bifurcated and each branch of the fork have upon its inside face a groove to engage the rib or key of the end of the rock-shaft and in connection with which some convenient means of securing the lever to the shaft and the grooves and keys in engagement will be employed. The bow-shaped lever in intimate union with the rock-shaft makes a continuous member as rigid as if integral and wherein the application of power to either side will be communicated to both ends of the rock-shaft and the work thereof be performed with equal effectiveness irrespective of the point at which the lever is engaged by the hand of the operator. The inner faces of the arm or lever which is to receive the groove may be provided with a hub which will have a groove milled across it, and the shaft may have a straddling miller run across its ends to produce corresponding rib. For the purpose of producing an absolutely-tight union between the parts the grooves and the ribs may be tapered and be of sufficient relative sizes that a tight fit will be had, which so far as the securing means is regarded as acting with a constant binding force may be termed a "clamp," it having a continuous clamping action, although of a practically permanent character. A hole may be made through the hub and a corresponding screw-threaded hole provided in the end of the shaft, so that a screw may be employed for drawing the tapered groove down tight upon the tapered rib, whereupon a secure lock will be had and the parts be rigidly held together as securely as if they were integral.

It will be obvious that the keys or ribs may be formed on the lever and the grooves on the shaft and that other means than a screw as described may be used to bind the parts together and that in some situations a single arm may be employed in place of the bow formation and that two disconnected arms may also be used.

The lever or arm will be made of such suitable material that it will withstand the requirements of the particular employment in hand and may be made of a different material to that from which the shaft is made, various reasons controlling the selection of the various materials—as, for instance, if it is necessary to make the shaft of a hard metal and it is desired for the purposes of ornamentation to use brass or some other soft metal for the lever, or if in the special employment it is necessary to make the shaft of brass or some other comparatively soft metal and the handle or actuating-lever is in such a position that it will receive treatment or abuse which brass would not withstand, then, of course, it would be necessary to make the two elements of different material. It may for commercial reasons be found desirable to make the shaft from tool-steel and the actuating-lever of cast-iron. From all of which reasons it is desirable to make the parts separate; but owing to the control which is desired to be had by such parts it is necessary that the union or connection between the parts be secure to the extent in many instances of rigidity.

In some connections for commercial reasons it may be desired to put a cast handle or lever upon a rock-shaft which it is desired to machine in several ways, and the presence of the handle or lever would make it difficult and at times impossible to run the shaft through the machines for its fashioning, certain peculiar formations of handle being demanded by certain styles of machine irrespectively of the peculiarities of the rock-shaft. Here, again, a means of procuring a stable union between the parts makes such construction feasible.

In some machines for economy of space and facility of actuation it is necessary to control two or more parts by a single handle or lever, in which case after the manner in which such parts shall be actuated has been determined the parts may be so constructed that they can be assembled with absolute precision to perform the various functions in the manner demanded by the law of the machine. If, for instance, one of such parts is to be controlled by a rock-shaft and another of such parts is to be controlled by the rock-arm actuating such shaft, it is essential not only that the parts should be assembled with a very small margin of variation to cause error, but that after having been assembled and the error corrected by adjustment the parts should remain and continuously maintain their relative timing. It would in such constructions therefore be necessary to secure the rock-shaft to its rocker-arm or actuating-lever with precision and to so secure the two parts that they will not lose their relative adjustment. In the manufacture of many such machines it is desirable not only to produce uniformly-acting machines, but machines which may be assembled by the workman without having recourse to special tests for accuracy upon the initial assembling of the parts.

In the drawings accompanying and forming part of this specification a practical form of an embodiment of my invention is illustrated, wherein—

Figure 1 is a plan view. Fig. 2 is a central sectional view. Fig. 3 is an enlarged central section of a portion of the device. Fig. 4 is a top view of the same portion. Fig. 5 is a perspective view of a form of rock-shaft. Fig. 6 is a central cross-section thereof. Fig. 7 is a perspective view of one end of a clamping-lever or rocker-arm. Fig. 8 is a perspective view of a form of bolt or index-pin. Fig. 9 is a perspective view of a form of rocker for actuating such bolt or index-pin, and Fig. 10 is a section showing the rock shaft and arm assembled.

The various parts are shown herein as mounted upon a frame designated in a general way by 10 and having a bearing 11, in which is mounted a shaft 12. Side members 13 of the frame support an arc-shaped framing member or apron 14, which has a dependent segment 15 at its rear, a channel 16 presenting a bearing-face 17. Such channel in the present instance is shown upon the rearward side of the segment. Adjacent to the channel is shown a plane face 18, which extends along the lower side or face of the segment 15 and beneath such channel and is provided with a series of notches 19, in the present instance shown as slightly conical.

A beam-arm or swivel 20 is shown as having a hub 21, secured in the present instance by a pin 22 to the shaft 12, and is shown as projecting under the frame and beyond the apron 14 and ending in a handle 23. A clamping block or plug 24 is carried by the swivel and has at its upper end a channel 25, making a protrusion 26 to run in the channel or groove 16 and having a face 27 to frictionally engage the face 17. The beam-arm is provided with a cylindrical bearing 28, transversely disposed to the opening, carrying the block 24, and in which bearing is mounted a rock-shaft or actuator 29, having a recess 30 milled into it midward of its ends, making a lip or engaging face 31, which is organized to enter a cut-away portion 32 in the clamping-block 24 and to engage a face upon such clamping-block to actuate the same. The engaging face upon such clamping-block in the present instance is shown as adjustable and in the form of a screw 33. The face of the lip 31 is cut away at 34, so as to bring the bearing-point of such lip as near the center of the rock-shaft as possible for the purpose of increasing the leverage and also increasing the amount of movement the rock-arm will be compelled to have to accomplish a given amount of movement of the clamping-block.

The actuating-lever or rock-arm in the present instance is shown as comprising a forked or bow-shaped member 35, carrying at each end upon its opposing faces hubs 36, which hubs have grooves 37, which may in practice be milled upon them. In the present instance the grooves are in a line parallel to the general line of the lever. The hubs are also provided with centrally-disposed bores 38. Each end of the rock-shaft is shown as having a centrally-disposed screw-threaded hole 39 and running across such end a rib or key 40. The channels 37 and the ribs 40 are shown as tapering slightly.

Fig. 10 shows the hub and rock-shaft slabbed off to show the manner in which the parts may be fitted together. The taper of the rib or key and groove may be regarded as somewhat exaggerated for the purposes of illustration. It will be seen in such view that the face 41 of the hub rests upon the face 42 of the rock-shaft, the channel or groove being deeper than the rib or key, whereby it is prevented from seating in the groove; but the tapering faces are bound together by the screw 43, occupying the bore 38 and hole 39, which also holds the faces 41 and 42 together.

The beam-arm 20 is shown as carrying at a little distance forward of the clamping-block a bolt or index-pin 44, having a conical end portion 45. The body portion 46 of the bolt is cut away at 47, making a clearance-space for an actuator and an engaging face 48 for the contact of the same. The bolt ends in a reduced portion 49, passing through a hole in the beam which is surrounded by a shelf 50, between which and the body portion of the bolt a coiled spring 51 may be interposed for holding the bolt to its work. A rocker or actuator 52 is carried by the beam-arm transversely of the bolt 44 and is shown as cut away, making a lip or engaging face 54 somewhat in the nature of a cam and somewhat of a crank to engage the face 48 upon the bolt and to press the same against the action of its spring. The rocker 52 carries a lever-arm 55, which is situated in the path of movement of a lug 56 upon the rocker-arm or lever 35, whereby upon the elevation of the rocker-arm such lever 55 will be raised, will turn the actuator 52, and depress the bolt or index-pin. A pair of guide-pins 57 are carried by the handle 23 and pass through holes in the arm 35, suitable coiled springs 58 surrounding such pins and pressing upon the arm. A clearance-space may be left between the floor 59 of the arm and the heads 60 of the pins 57, so that the full force of the spring will at all times be received upon the rock-shaft and be transmitted by it to the clamp and the rocker-arm or lever be permitted a comparatively long stroke, whereby it may perform its other functions with facility. The arms 35 may be provided with chambers 61 to receive the springs, so that such arms may be drawn against the handle of the beam without the interference of the interposed springs.

In the present instance the movement of the clamping-block 24 is merely sufficient to cause its engaging face to frictionally bear upon the engaging face upon the segment and to move therefrom sufficiently to relieve the clamping friction.

In many mechanisms the rocker-arm of a rock-shaft must be so securely held in relation thereto that there will be no lost motion. This is more especially so when the rocker-arm besides rocking the shaft has to perform other work and in timed relation to the rocking of the shaft. It will be seen that the arm herein is brought into stable contact with a broad bearing-face of the rock-shaft and that the rib-and-groove connection prevents independent movement. The tapering of such parts produces a continual binding or clamping, adding length to the life of the parts.

Of course it will be apparent that the environment of the parts forming the invention are merely for purposes of illustration and that the work of the device will control to a large measure its form in each particular instance of its employment.

Certain features illustrated herein are claimed in my copending applications, Serial Nos. 175,421, 175,425, and 175,426, filed October 2, 1903.

Having thus described my invention, I claim—

1. A lever having two limbs; each limb having a groove in the side facing the other limb and a hole passing through each limb and opening in its groove; a rock-shaft to be embraced by the limbs having a rib on each end to take into the grooves; said ribs and grooves being on the plane of normal movement of the parts in assemblage; and means to bindingly secure the parts when assembled.

2. The combination with a lever having a pair of ends each having a hub on the side facing the other, said hubs having plane faces and a groove across the same, of a rock-shaft having plane-faced ends and ribs protruding therefrom to mate respectively with the faces and grooves of the hubs; and means to bind the same together in rigid union.

3. The combination of a lever having two branches, the branches having plane faces opposite each other and a channel in each face tapering toward its bottom; a rock-shaft having at each end a plane face and a rib protruding therefrom to mate with the channel and tapering from its base outwardly but of less height than the depth of the channel; and means to hold the same together, whereby the rib and channel will bind and the flat faces impart stability to the structure.

4. The combination with a frame, of a beam pivoted thereon; two locking-bolts carried by the beam efficient when actuated in constant timing one relative to the other; a rock-shaft to actuate one of said bolts, such rock-shaft having ribs on its ends; a bow-shaped rocker-arm therefor having grooves on its ends to mate with said ribs; and an actuator for the other bolt in the path of movement of the rocker-arm.

5. The combination with a frame, of a beam pivoted thereon; two locking-bolts carried by the beam efficient when actuated in constant timing one relative to the other; a rock-shaft to actuate one of said bolts, such rock-shaft having ribs on its ends; a bow-shaped rocker-arm therefor having grooves on its ends to mate with said ribs; and an actuator for the other bolt in the path of movement of the rocker-arm, the grooves and ribs being transverse to the direction of the reaction of said actuator upon the rocker-arm.

6. The combination with a structural part, of a part shiftable adjacent thereto; a number of devices to lock said parts together and carried by one of them; a rock-shaft to control one of said locking devices and having grooves in its ends; a bifurcated lever therefor having ribs to mate with said grooves; means to bind said ribs in said grooves; an actuator to control another of said locking devices and situate in the path of movement of said lever; the point of contact thereof being substantially in the plane of said grooves and ribs.

Signed at Nos. 9 to 15 Murray street, New York, N. Y., this 19th day of September, 1903.

FRANCIS H. RICHARDS.

Witnesses:
   CHAS. LYON RUSSELL,
   FRED. J. DOLE.